US007753035B2

(12) United States Patent
Collet

(10) Patent No.: US 7,753,035 B2
(45) Date of Patent: Jul. 13, 2010

(54) METHOD FOR DIAGNOSING THE OPERATION OF A PURGE DEVICE OF AN ENGINE

(75) Inventor: Thierry Collet, Fontenilles (FR)

(73) Assignee: Continental Automotive France, Toulouse (FR)

( * ) Notice: Subject to any disclaimer, the term of this patent is extended or adjusted under 35 U.S.C. 154(b) by 367 days.

(21) Appl. No.: 11/798,089

(22) Filed: May 10, 2007

(65) Prior Publication Data

US 2008/0245347 A1 Oct. 9, 2008

(30) Foreign Application Priority Data

May 12, 2006 (FR) .................................. 06 04215

(51) Int. Cl.
*F02M 33/02* (2006.01)
*G06F 19/00* (2006.01)

(52) U.S. Cl. ...................................... 123/520; 701/103

(58) Field of Classification Search ......... 123/520–521, 123/519, 478, 480, 486; 701/103–105
See application file for complete search history.

(56) References Cited

U.S. PATENT DOCUMENTS 5,924,956 A * 7/1999 Kobayashi et al. .......... 123/520
6,886,397 B2 5/2005 Esteghlal et al.
7,007,684 B2 * 3/2006 Itakura et al. ............... 123/520
7,124,018 B2 10/2006 Hassdenteufel et al.
2002/0139360 A1 10/2002 Sato et al.
2004/0250805 A1 12/2004 Osanai

FOREIGN PATENT DOCUMENTS

DE 103 24 813 1/2005
DE 10 2004 022 999 12/2005
WO 02/18165 3/2002

* cited by examiner

*Primary Examiner*—Hieu T Vo
(74) *Attorney, Agent, or Firm*—Young & Thompson

(57) ABSTRACT

This involves diagnosing the operation of a fuel vapor purge device on an internal combustion engine. The pressure value and/or mass flow rate admitted to the air inlet manifold is determined upstream of the manifold where it communicates with the vapor recirculation pipeline, a command to open the electrically operated purge valve is issued, the engine control electronics are provided with the pressure and/or mass flow rate value determined at the start, without taking account of the mass flow rate that should have passed through the valve if it is opened, the engine reacts, according to whether or not vapors have been supplied to the manifold, and at least one operating parameter of this engine is detected, and if this parameter does not reveal any variation in the engine operation it is deduced that there is a deficiency in the opening of the valve and/or a malfunctioning of the purge device.

6 Claims, 1 Drawing Sheet

METHOD FOR DIAGNOSING THE OPERATION OF A PURGE DEVICE OF AN ENGINE

BACKGROUND OF THE INVENTION

The present invention relates to diagnostics of the purge valve ("canister") that a motor vehicle internal combustion engine comprises. A "canister" is a fuel vapor trap.

DESCRIPTION OF THE RELATED ART

In a modern internal combustion engine, it is essential that there be a fuel vapor canister for emission control purposes.

The device which accommodates it allows vapors escaping from the fuel tank to be treated and stored so that they can be recirculated when the fuel vapor canister is purged by introducing them into the engine air inlet manifold.

Thus, fuel vapors which might otherwise have escaped into the atmosphere were the device not present are recirculated into the engine and used as fuel.

This purging of the fuel vapor canister is brought about by an electrically operated valve, itself driven by the ECU (the "engine control unit" also known as the "power unit control module" or PCM).

It is in the interest of the engine control system to diagnose any malfunction of this electrically operated valve which has to open and close when commanded to do so.

Usually, operation of the electrically operated valve is diagnosed by checking it has actually opened. Thus, a check is made to ensure that the valve has opened by examining the influence that this opening has on the operation of the engine, typically at idle speed.

Unfortunately, this technical solution is not "robust" (reliable and durable) in the diagnostics phase.

Specifically, when a command to purge the fuel vapor canister is transmitted to the electrically operated purge valve the ECU/PCM, hereinafter termed the "ECU", takes account of the information concerning the expected mass flow rate through this electrically operated purge valve in order to govern the other engine control parameters. Now, this command to open has an influence on the operation of the engine which influence is of the same order of magnitude as the influence that occurs when the electrically operated valve is jammed, and therefore does not open, or opens inappropriately. This is down to the inaccuracy in the model used to calculate the mass flow rate through the electrically operated purge valve (which is due to the manufacturing spread on the components, to imperfections in the modeling and to the calibration of the ECU, in particular).

Typically, a diagnostic device of the prior art operates under the following conditions: the engine air inlet manifold is usually equipped with a pressure sensor which is downstream of the point at which the purge from the electrically operated valve opens.

Through the difference in pressure between the air pressure read by the sensor at the location of the air inlet manifold and the ambient (atmospheric) pressure, the engine on-board electronics estimate, from a pre-established model, the value of the expected mass flow rate through the electrically operated purge valve.

Once the value of the expected mass flow rate through the electrically operated valve has been calculated, this value is added, in the calculation electronics, to the value of the mass flow rate measured upstream of the valve (typically a butterfly mounted so that it can be turned) which regulates the flow of air into the inlet manifold, so that this value can be taken into consideration for governing the (or at least some of the) other engine control parameters.

Since the calculated value of the mass air flow rate in the inlet manifold is very precise, the slightest inaccuracy is taken into consideration by the ECU and the other engine control parameters concerned find themselves modified as a result. Specifically, the calculated value of the mass air flow rate in the inlet manifold governs the amount of fuel to be injected, which governs the production of engine torque and the gaseous/polluting emissions of this engine. Inaccuracies in one of these engine control parameters may disturb the behavior of this engine and influence the results of the diagnostics.

Such diagnostics are therefore not reliable, or not reliable enough.

SUMMARY OF THE INVENTION

It is one object of the invention to provide definite and "robust" diagnostics making it possible to determine for definite whether the purge valve is operating.

In this case, one object is for the actual mass flow rate and/or the actual inlet pressure in the air inlet manifold not to vary (appreciably), if the valve is jammed (and therefore does not open or does not open correctly). The control parameters for the ECU are unchanged. By contrast, if the valve does open, the values of the physical parameters considered will change (for example the engine speed and/or the values detected by a lambda probe positioned in the exhaust system will vary). It will therefore be possible to establish an effective diagnosis.

Thus, the invention proposes a method for diagnosing the operation of a purge device comprising a purge valve for purging a fuel vapor canister of a vehicle internal combustion engine, said purge valve communicating, via a vapor recirculation pipeline, with an air inlet manifold of the engine in order to recirculate at least some of these vapors thereto when the valve is open, the method being characterized in that:

a) the value of the inlet pressure and/or of the inlet mass flow rate in the air inlet manifold is determined upstream of the region of the inlet manifold where the latter communicates with the vapor recirculation pipeline, b) at a given moment a command to open the electrically operated valve (purge valve) is issued, c) whether the electrically operated valve is open or closed, the engine control electronics are provided with the value of the inlet pressure and/or of the inlet mass flow rate determined in step a) without taking account of the mass flow rate through the electrically operated valve if it is open, d) the actual mass flow rate or the actual pressure of the air actually admitted via the engine through said inlet manifold is allowed to generate a possible variation in the operation of this engine depending on whether or not it was consistent with the value determined during step a), e) at least one operating parameter for this engine is therefore detected and, if this parameter does not reveal any variation in the operation of the engine during step d), this fact is used to deduce that there is a deficiency in the opening of the purge valve and/or a malfunctioning of the purge device.

Advantageously, the operating parameter or one of the operating parameters of the engine that is detected during step e) is the engine speed and/or the pressure in the exhaust system and/or the content of certain gases produced by the engine, in this exhaust system.

For preference, the operating parameter or one of said operating parameters of the engine that is detected during this step e) will be supplied by a measurement sensor, preferably the lambda sensor positioned in the exhaust.

DESCRIPTION OF THE PREFERRED EMBODIMENTS

Figure 1:
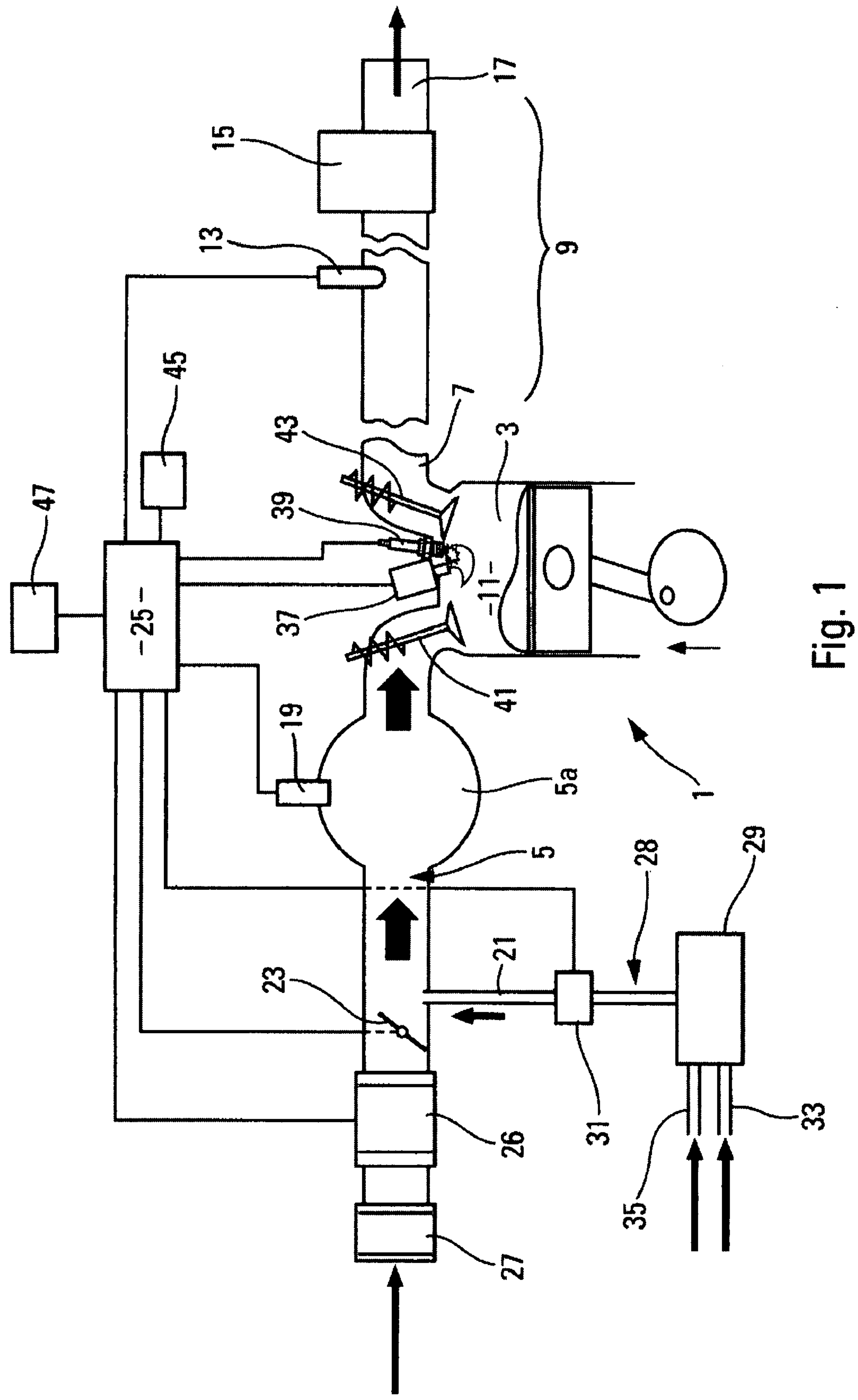
FIG. 1 diagrammatically depicts the elements used in the invention.

A description with other details of the invention follows, by way of example and with reference to the attached drawings which are also provided by way of example and in which FIG. 1 (the only FIGURE) diagrammatically depicts, in conjunction with the invention, a collection of means present in a vehicle internal combustion engine and which contribute to the operation thereof.

This FIGURE schematically depicts part of a vehicle internal combustion engine 1. One of the cylinders 3 of this engine communicates upstream, with the air inlet manifold 5 and, downstream with the exhaust manifold 7 which itself communicates with the exhaust system 9.

Downstream of the exhaust manifold 7 through which the burnt gases produced in the combustion chamber 11 are discharged, the exhaust system 9 comprises a lambda probe 13 positioned upstream of a catalytic converter 15 mounted on the catalytic exhaust system 17 of the vehicle through which the gases are discharged into the atmosphere.

The lambda probe 13 is an oxygen probe used to measure the richness of the fuel/air mixture supplied to the cylinders of the engine, and therefore, in particular, to the cylinder 3. It is positioned very precisely because its position governs the effectiveness of the measurement taken by the probe, which is therefore designed to detect the amount of oxygen present in the exhaust gases.

In the air inlet manifold 5 there is a chamber 5*a* housing a pressure sensor 19 that senses the pressure of the fluid flowing through this manifold. This sensor is typically of the MAP (manifold absolute pressure) sensor type.

Further upstream the air inlet manifold 5 communicates with a fuel vapor recirculation pipeline 21 which opens into the inlet manifold 5 downstream of the valve 23 (or butterfly valve) that allows greater or lesser amounts of air into the manifold 5 typically according to the command transmitted by the engine control unit (ECU) 25.

This engine control unit 25 therefore corresponds to the power unit control module. Connected to a certain number of sensors and actuators, it controls, in particular, the distribution of fuel, the idle speed, the ignition advance timing and the gaseous emissions systems on the exhaust side.

The valve 23 in the inlet manifold 5 is situated downstream of the mass flow meter 26 (MAF sensor sensing incoming mass air flow rate) whose task is to measure the amount of air admitted to the manifold 5 from the external air intake 27 that is open to the atmosphere.

The fuel vapor recirculation pipeline 21 receives a certain amount of fuel vapors from the storage volume of the fuel vapor canister 29, when the electrically operated valve 31 placed on the pipeline 21 is open.

Typically, the fuel vapor canister 29 belongs to a storage/purge device 28 and receives the fuel vapors from a pipeline 33 connected to the fuel tank of the vehicle. It also receives a certain amount of external air via a pipeline 35 open to the atmosphere.

The forthcoming explanations regarding fluid pressures could be applied to circulating fluid mass flow rates and vice versa.

When the engine 1 (embodied here essentially in the form of its cylinder 3) is in operation, and outside of periods in which the fuel vapors contained in the storage volume 29 of the canister are being purged (the electrically operated valve 31 therefore being assumed to be closed), the pressure sensor 19 detects the air pressure in the air inlet duct 5 which is therefore not receiving any vapor from the pipeline 21.

This value is transmitted to the ECU 25 where the mass air flow rate (MAF-CYL) entering the cylinder(s) is calculated in a way known per se.

At least one of said values is transmitted by the ECU in order to define the amount of fuel to be supplied to each cylinder in order to obtain optimized combustion conditions.

Typically, the data supplied by the lambda exhaust probe 13 is taken into consideration by the ECU to determine this amount of fuel, here injected into the cylinder 3 by the injector 37, the fuel/air mixture therein being ignited by the spark plug 39, the operating cycle of which is controlled by the ECU, the respective inlet 41 and exhaust 43 valves participating in the customary successive operating cycles of the engine by timing the inlets of fluid (oxidizing air) from the air inlet duct 5 and the expulsion of exhaust gases to the exhaust system 9, once again, in conjunction with the ECU.

During periods in which the fuel vapors contained in the storage volume 29 are being purged, the electrically operated valve 31 is supposed to be open and a certain amount of fluid containing these vapors is supposed therefore to arrive in the inlet duct 5 via the pipeline 21.

As has already been stated, the fluid arriving from the pipeline 21 comprises a mixture made of fuel vapors from the pipeline 33 and external air from the pipeline 35, it being possible for these to be metered by known means.

Typically, using the difference in pressure between the pressure read by the sensor 19 and the ambient pressure, the ECU 25 is able to estimate (to calculate) the value of the mass flow rate passing through the electrically operated purge valve 31, for example using a modeling table stored in the memory and which was devised on a test bed.

Once the value of this mass flow rate passing through the electrically operated valve 31 has been calculated, this value may be typically added to the air mass flow rate value measured by the flow meter 26 upstream of the valve 23, and may thus be taken into consideration, still by the ECU, to govern the other engine control parameters (mass flow rate of fuel, injection cycle for each injector 37, etc.).

Such operation does, however, presuppose that the electrically operated valve 31 has opened correctly in response to the command transmitted to it by the ECU when the fuel vapor purge phase was begun.

Typically, the fact that the electrically operated valve 31 is open is checked by observing, in the ECU and by way of data supplied by the sensors such as 13 and 19, the influence that this opening has on the operation of the engine.

However, it was mentioned at the start of the description that there are imperfections in this approach (when used alone).

In order to be able to establish a better quality of diagnostics, particularly avoiding the inaccuracies already mentioned, the proposed procedure is as follows, at least during a diagnostics phase regarding the operation of the device 28 and in particular the correct operation of the electrically operated valve 31 when commanded by the ECU:

When the ECU 25 is going to command the electrically operated valve 31 to open in order to purge the fuel vapors, the subsequent data associated with the circulation of the vapor-laden fluid in the pipeline 21, then in the air inlet duct 5, will be at least temporarily short-circuited so that the control data transmitted by the ECU 25 do not take account of (ignore) this expected additional mass flow rate and consequently the engine operating orders correspond to a situation in which purge is not taking place. The engine operating process governed by the ECU is therefore not expecting any disruption arising out of this additional quantity of fluid on the inlet side.

If the electrically operated valve 31 has opened correctly, the actual operation of the engine will therefore have to be disrupted, because the actual mass flow rate of fluid in the inlet manifold 5 will be higher than the one considered (estimated/calculated) by the ECU 25 as a result of the last data it received.

The ECU 25 will thus in particular have fed back to it data associated with this "disrupted" operation, particularly via the readings supplied by the lambda probe 13 (which will transmit modified values regarding the amount of oxygen in the exhaust gases) and/or through a variation in engine speed for example.

If the air inlet duct 5 has actually received an additional amount of fluid from the pipeline 21, and the electrically operated valve 31 has therefore correctly opened beforehand, the ECU 25 will therefore receive data testifying to disrupted operation of the engine under the aforementioned conditions.

This disruption data can be quantified and recorded in the memory means conventionally associated with the ECU 25.

From these considerations, a test conducted on the appearance of this disruption, or even on its magnitude (then having recourse to a predetermined and prerecorded threshold value) will allow a precise and reliable diagnosis to be made as to the operation of the purge device 28.

Specifically, it has been understood that, if the command to open the electrically operated valve 31 has not led, in the inlet duct 5, to an additional arrival of fluid from the purge pipeline 21, this is in particular certainly because the electrically operated valve 31 has not opened correctly. The ECU 25 has therefore in actual fact received correct information as to the conditions obtaining in the inlet duct 5. Normal engine operation has not been disturbed and, a posteriori, this ECU 25 has also received information of effectively normal engine operation (in particular the lambda probe 13 has detected no variation in the composition of the exhaust fumes).

Thus, if the parameters ultimately received by the ECU remain unchanged, this is because the purge has not been performed correctly when the command to open was transmitted to the electrically operated valve 31.

It will be noted that such diagnosis is definite, gets around the inaccuracy problems mentioned at the start of the description in considerations of the prior art, and in practice, is not appreciably disruptive to vehicle operation given that, in practice, the purge phases, particularly the diagnostics phases pertaining to correct operation of the electrically operated purge valve, are of brief duration. To begin with the data supplied by the engine operating sensors are very frequently supplied to the ECU 25 and any disruption of operation observed downstream of the system, particularly by the lambda probe, is quickly fed back to the ECU which, in practice, therefore in any event quickly alleviates the effect of any observed disruption without prejudice either to the driver or to the vehicle.

Preferably, the diagnostics procedure is carried out at engine idle speed. It may nonetheless, by extrapolation, also be carried out at a steady-state engine speed at which no variation in the monitored parameters is expected.

The invention claimed is:

1. A method for diagnosing the operation of a purge device (28) comprising a purge valve (31) for purging a fuel vapor canister (29) of a vehicle internal combustion engine (1), said purge valve (31) communicating, via a vapor recirculation pipeline, with an air inlet manifold (5) of the engine (1) in order to recirculate at least some of these vapors thereto when the valve (31) is open, the method comprising the steps of:

a) determining a value of at least one one of i) an inlet pressure and ii) an inlet mass flow rate in the air inlet manifold (5), the inlet mass flow rate being measured at a region upstream of an opening of a vapor recirculation pipeline (21) into the air inlet manifold, b) issuing a command to open the purge valve (31), c) providing engine control electronics of the engine (1) with the value determined in step a), the value being provided to the engine control electronics without taking account of a mass flow rate passing through said purge valve (31) and whether said purge valve (31) is open or closed, d) allowing one of i) an actual mass flow rate and ii) an actual pressure of the air actually admitted to the engine (1) through said inlet manifold (5) to generate a variation in the operation of the engine inconsistent with the value determined during step a), e) detecting at least one engine operating parameter to determination an occurrence of the variation in the operation of the engine during step d), and using the determination of the variation to determine at least one of i) a deficiency in opening of the purge valve (31) and ii) a malfunctioning of the purge device (28) and f) upon determining the one of the deficiency and the malfunctioning in step e), respectively adjusting the operation of the purge valve and the purge device.

2. The method as claimed in claim 1, wherein the operating parameter detected during step e) is the engine speed.

3. The method as claimed in claim 2, wherein the operating parameters detected during step e) include one of i) the exhaust pressure and ii) a content of a gas in the exhaust system (9).

4. The method as claimed in claim 1, wherein the operating parameter detected during step e) is one of i) the exhaust pressure and ii) a content of a gas in the exhaust system (9).

5. The method as claimed in claim 1, wherein the operating parameter detected during step e) is supplied by a measurement sensor (13).

6. The method as claimed in claim 5, wherein the measurement sensor is a lambda probe (13) positioned in the exhaust system (9).

* * * * *